June 19, 1956 J. R. OISHEI 2,750,617
WINDSHIELD WIPER
Filed May 23, 1950
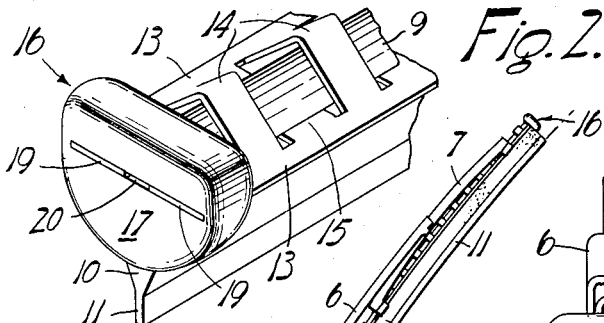
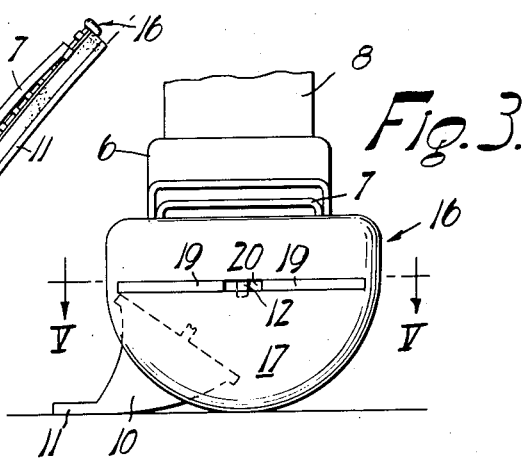
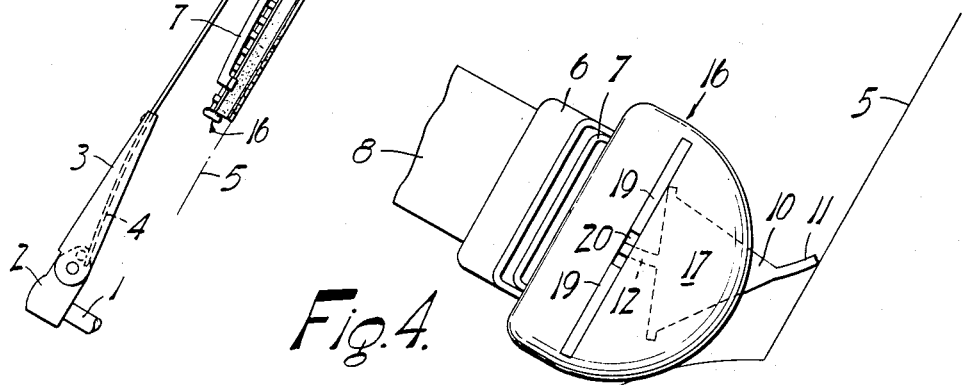
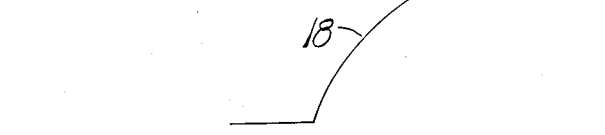
INVENTOR.
John R. Oishei
BY
Bean, Brooks, Buckley & Bean.
ATTORNEYS United States Patent Office 2,750,617
Patented June 19, 1956

2,750,617

WINDSHIELD WIPER

John R. Oishei, Buffalo, N. Y., assignor to Trico Products Corporation, Buffalo, N. Y.

Application May 23, 1950, Serial No. 163,599

7 Claims. (Cl. 15—245)

This invention relates to the windshield cleaning art and especially to the wiper or blade which is reciprocated back and forth over the windshield surface to maintain a clear field of vision therethrough.

The wiper, to function efficiently, must possess a rather high degree of flexibility sufficient to enable the wiping edge to turn or roll to a dragging position at the start of its stroke. This high degree of flexibility is more essential in a wiper for curved windshields and particularly when the wiper is provided with an enlarged wiping edge or body in turn supported by a thin web from the flexible holder, because when the metal holder is bent to conform the wiping edge to the curvature of the surface the web must flex about the arc to enable the wiping edge assuming its dragging position. Consequently, the thinner the supporting web the greater will be its flexibility. However, the rubber is, of course, subject to variations in compounding, in curing, and in chlorinating. It may oxidize and harden during periods of inactivity and break or tear thereafter. If by any chance the material is chemically or physically faulty and the thin web breaks or tears, then the metal holder will drop into contact with the glass surface and scratch if not ruin it.

The present invention is in the nature of a precautionary measure and constitutes a means by which the windshield glass will be safely protected against harm should the rubber deteriorate or rupture and permit its holder to fall upon the windshield surface.

Again, the invention has for its object to provide guard means on the holder for becoming effective upon the failure of the rubber or squeegee element to support the holder spaced above or in front of the glass.

The foregoing and other objects will manifest themselves as this description progresses, reference being made therein to the accompanying drawing, wherein—

Fig. 1 is a side elevation of a wiper in use and embodying the present invention;

Fig. 2 is a fragmentary perspective view of the wiper accentuating one of the guards;

Fig. 3 is an end elevation of the wiper depicting the guard in use;

Fig. 4 is a similar view illustrating the guard as it further functions; and

Fig. 5 is a fragmentary horizontal section about on line 5—5 of Fig. 3 and prior to the break in the rubber web.

Referring more particularly to the drawing, the numeral 1 designates an oscillatory drive shaft to which is fixed the wiper carrying arm having a mounting section 2 and a pivoted outer section 3 pressed by a spring 4 to urge the wiper into wiping contact with the windshield 5. This spring pressure is distributed along a series of longitudinally spaced points to the flexible backing strip or holder of the wiper by suitable means, such as a primary yoke 6 and two rockably connected secondary yokes 7. The outer end of the wiper carrying arm is joined to the primary yoke by a connector 8. The wiper illustrated comprises an elongate squeegee of rubber, or like resilient stock, and a holder therefor. The squeegee element has an anchoring bead 9, a wiping body 10 with a wiping edge 11, and a relatively thin uniting web 12. The holder is preferably a metal stamping and has side bars or rails 13, joined by arches 14 which seat upon the anchoring bead, and inwardly extending fingers 15 which engage beneath the anchoring bead to retain it in place. The outer ends of the secondary yokes slidably engage the side rails and apply the arm pressure thereto for causing the wiping edge to follow the contour of the windshield surface. The foregoing is more fully described and claimed in the copending application Serial No. 161,086.

The web or neck portion 12 is necessarily thin in order to give the heavier wiping body 10 the freedom for flexing in following the curvature of the windshield surface. However, should the thin supporting web weaken or rupture the metal holder will be let down upon the glass and mutilate it. According to the present invention, means are provided to preclude and prevent this, such means being in the form of a guard 16 of a suitable soft or cushion material incapable of scratching the glass surface. When formed of rubber its active portion may be given a semi-circular shape, as at 17, with a diametral dimension greater than the width of the holder to properly support the latter should the squeegee fail. If there is provision made for the holder to rock, then the guard will still function. Furthermore, when the wiper is parked against the windshield frame or molding 18, the guard will avoid marring its finish. Preferably, a guard is mounted on each end of the holder. As illustrated, a practical mounting is obtained by providing terminal extensions 19 on the opposite ends of the side rails 13 to engage in seats 20 in the guards or skid members, the seats being in the form of slots. The mounting extensions have overhanging keeper parts 21 to interlockingly anchor the guards in place against the shoulders 22. Where the slots 20 extend entirely through the guard body, the keeper parts 21 will be inset to avoid projecting metal portions. The guards or skids have their arcuate active edge portions 17 constituting running edges on which the wiper may slide and serving as bumpers to cushion the contact with the windshield molding.

The cross straps or arches 14 provide resilient connections between the side rails and enable the latter being sprung together to facilitate the mounting and demounting of the guards. The presence of the guards affords a safety factor for the curved windshield wiper with its readily flexible mounting web for the relatively heavy wiping body. The guards provide protection for the glass against both the longitudinal marginal edges as well as the underface of the holder coming into contact therewith. Further, the guards are simple in design and expeditiously mounted in a practical manner, and while the foregoing description has been given in detail, it is without thought of limitation since the inventive principles involved are capable of assuming other physical embodiments without departing from the spirit of the invention and the scope of the appended claims.

What is claimed is:

1. A windshield wiper having a squeegee element, a flexible channel holder therefor having flexible side rails arranged in coplanar relation and supporting the element at opposite sides and cross straps connecting the side rails and resiliently supporting them spaced apart, said element being longitudinally displaceable from between the ends of the side rails at one end of the wiper, and a relatively soft guard having an opening interlockably receiving the ends of the side rails at said one end of the wiper and obstructing such displacement, the rails having shoulders interlocking with the guard to preclude its displacement therefrom.

2. A windshield wiper having a squeegee element, a flexible channel holder therefor having flexible side rails arranged in coplanar relation at opposite sides of the squeegee, and cross straps connecting the side rails and resiliently supporting them spaced apart, the opposite ends of the side rails having their outer margins notched, and guard members each having an opening for receiving the cooperating notched ends of the side rails at a respective end of the wiper, the cross straps serving to resiliently secure the interlock between the guards and the notched ends.

3. A curved windshield wiper having a squeegee with a wiping edge enlargement suspended by a relatively thin supporting web subject to bending and stretching during reciprocation of the wiper, a metallic flexible holder having resiliently joined squeegee embracing portions at the opposite sides of the web and an outer terminal extension part formed with a transverse shoulder, and a normally inactive skid member part having a seat into which the extension part is interlocked, one part being laterally yieldable for mounting engagement upon the other part to enable the skid member part being engaged behind the transverse shoulder.

4. A curved windshield wiper having a squeegee with a wiping edge enlargement suspended by a relatively thin supporting web subject to bending and stretching during reciprocation of the wiper, a metallic flexible holder having resiliently joined portions loosely embracing the opposite sides of the web, and a skid member having a slot into which the portions are yieldably interlocked, said portions having overhanging keeper parts disengageable from the skid member upon springing the portions toward each other.

5. A windshield wiper having a squeegee element, a flexible channel holder therefor having flexible side rails arranged in coplanar relation to opposite sides of the squeegee, and cross straps connecting the side rails and resiliently supporting them spaced apart, the ends of the side rails at one end of the wiper having their outer margins notched, and a guard member having an opening for receiving the cooperating notched ends of the side rails at one end of the wiper, the cross straps serving to resiliently secure the interlock between the guard and the notched ends.

6. A windshield wiper having a squeegee element, a flexible channel holder therefore having flexible side rails arranged in coplanar relation at opposite sides of the squeegee, and cross straps connecting the side rails and resiliently supporting them spaced apart, the ends of the side rails at one end of the wiper having their outer margins notched, and a guard member having an opening for receiving the cooperating notched ends of the side rails at one end of the wiper, the cross straps serving to resiliently secure the interlock between the guard and the notched ends, the squeegee element having a wiping edge at the underside of the holder, and the guard having a portion extending short of the wiping edge and formed with a normally inactive and arcuate skid surface.

7. A windshield wiper arranged to receive pressure from a wiper carrying arm and comprising a squeegee of cushioning material having a wiping edge along one longitudinal margin and an anchoring part along its opposite margin, said wiping edge being carried on an enlargement suspended from the anchoring part by a relatively thin supporting web forming a hinged portion subject to bending and stretching under the tug from the wiping edge when it clings during back and forth movement of the wiper upon a windshield surface, a resilient holder in the form of a backing strip having greater width than thickness and flexible toward the surface in conforming the squeegee to the surface contour, said holder having a longitudinally extending seat receiving the anchoring part, said holder extending outwardly beyond the web portion, and an terminal cushioning support carried by the holder and depending therefrom to a point below the line of juncture between the suspended enlargement and its relatively thin supporting web, said terminal cushioning support being formed laterally of greater bulk relative to the web and serving to afford a stiffened sustaining support perpendicularly and laterally for the holder under the pressure from said arm.

References Cited in the file of this patent

UNITED STATES PATENTS

| | | |
|---|---|---|
| 1,358,804 | Waywell | Nov. 16, 1923 |
| 1,670,266 | Marlow | May 15, 1928 |
| 2,085,608 | Rodrick | June 29, 1937 |
| 2,094,206 | Dudley | Sept. 28, 1937 |
| 2,596,063 | Anderson | May 6, 1952 |

FOREIGN PATENTS

| | | |
|---|---|---|
| 337,700 | Great Britain | Nov. 6, 1930 |